United States Patent [19]

Frame et al.

[11] Patent Number: 5,566,033
[45] Date of Patent: Oct. 15, 1996

[54] METHOD AND APPARATUS FOR DETERMINING THE LOCATION OF INFORMATION ON A MAGNETIC TAPE

[76] Inventors: Gary E. Frame, 6841 Garden Grove Ave., Reseda, Calif. 91335; David M. Schacter, 8131 Quakertown, Canoga Park, Calif. 91306

[21] Appl. No.: 937,384

[22] Filed: Aug. 31, 1992

[51] Int. Cl.[6] .............. G11B 15/48; G11B 5/008; G11B 15/18
[52] U.S. Cl. .............. 360/74.6; 360/72.1; 360/96.5; 360/95
[58] Field of Search ................ 360/74.6, 74.5, 360/70, 71, 134, 95, 96.5, 85, 72.1, 72.2; 250/570, 566; 369/56, 197

[56] References Cited

U.S. PATENT DOCUMENTS

| | | | |
|---|---|---|---|
| 4,283,621 | 8/1981 | Pembroke | 235/375 |
| 4,380,032 | 4/1983 | Pfost | 360/74.6 |
| 4,470,086 | 9/1984 | Maeda | 360/95 |
| 4,665,318 | 5/1987 | Toda et al. | 250/570 |
| 5,216,556 | 6/1993 | Steinberg et al. | 360/71 |
| 5,283,703 | 2/1994 | Choi | 360/85 |

*Primary Examiner*—Aristotelis Psitos
*Assistant Examiner*—Varsha A. Kapadia
*Attorney, Agent, or Firm*—Paul Adams

[57] ABSTRACT

An improvement in a magnetic tape playback apparatus for determining the location of any portion of the magnetic tape as it passes the tape reading head including optically readable indicia means printed on the magnetic tape representing encoded information and means for optically reading the indicia including a light source and detector both mounted on one side of the tape. The improvement is compatible with existing magnetic tape playback devices and magnetic tape cassettes.

8 Claims, 3 Drawing Sheets

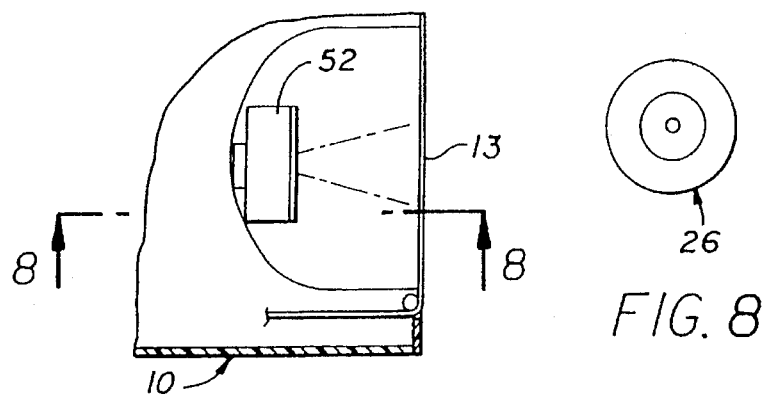
FIG. 8
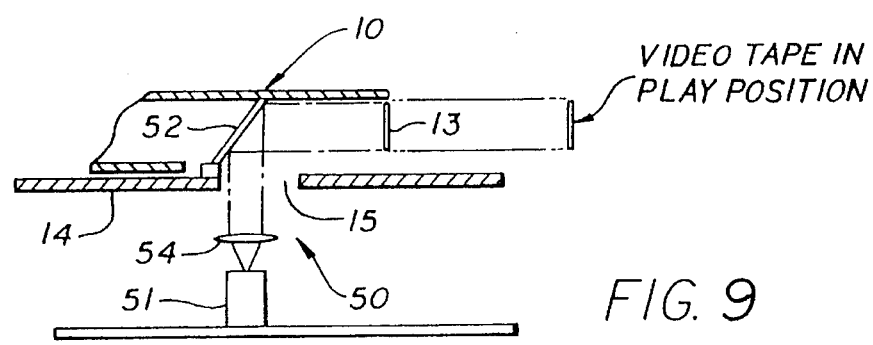
FIG. 9
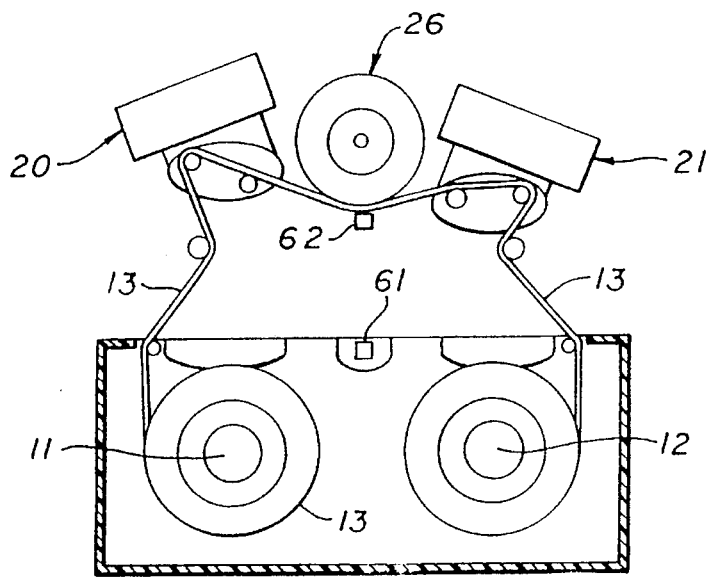
FIG. 10
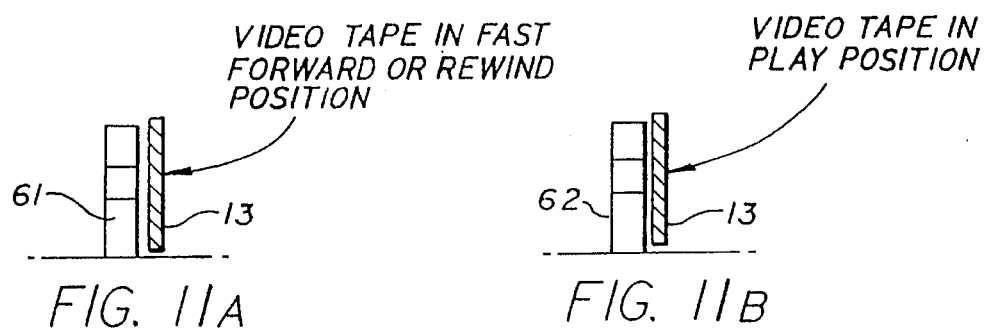
FIG. 11A
FIG. 11B

METHOD AND APPARATUS FOR DETERMINING THE LOCATION OF INFORMATION ON A MAGNETIC TAPE

BACKGROUND OF THE INVENTION

This invention relates to a method and an apparatus for identifying the location of information on a magnetic tape such as the type that may be used in a video cassette tape recorder (VCR). The method and apparatus may be employed in a wide range of devices for recording or playback of audio or visual information ranging from home video cassette and audio tape recorders to automatic information archiving and retrieval systems.

Presently, in a video cassette recorder, a magnetic tape is encased in a cassette having a mechanical form factor that has become standardized throughout the world. For a variety of reasons it is desirable to provide a visual or audible indication of the location of specific information on the tape. For example, in a VCR, it may be desirable to locate a scene in a movie, that was previously identified during normal operation of the VCR through operation of the fast forward or reverse movement of the tape. One common method for determining the location of information on a tape is through a mechanical counter. As a tape is wound or rewound, rotation of the spool is mechanically counted with the information provided through wheels similar to an odometer on an automobile. One problem with this approach is the complexity of converting revolutions to tape location since the diameter of the tape on the spool varies with each revolution. To overcome this drawback, a separate counter wheel may be movably mounted in frictional contact with the tape. But another problem with a mechanical counter is that each time a tape is begun, the counter must be reset to zero to determine the reference from which a location on the tape may later be determined. If a different machine is used, the counter must be the same as on the the machine originally used or the desired location will be mis-identified. Furthermore, in the event that a location is desired to be found on a tape that has not been completely rewound, it would be necessary to completely rewind the tape so as to reset the counter to provide the reference. This is not only time consuming and creates excessive wear on the tape, but is also an inconvenience. Furthermore, a typical magnetic tape used in video cassettes is temperature sensitive resulting in stretching or shrinkage. This shrinkage adversely affects the accuracy of the location-determining counter. Also, permanent stretching results as the tape is pulled through the playback machine during normal operation. After repeated use of the tape, such stretching can result in significant errors in a mechanical counting mechanism. Furthermore, mechanical counters may vary from machine to machine. Different manufacturers may use different mechanisms that would result in different results. Since there are typically no holes in video cassette magnetic tape, wheel slippage and difference in the counting wheel radius caused by wear or manufacturing tolerances will further result in errors regarding accurate location. The result is inaccuracy rendering the mechanical tape counters unsuitable for uses where precise positional information is required.

As an alternative to mechanical counters in the prior art, attempts have been made to electronically or magnetically record codes onto the tape which can then be read by various methods. Generally, the difficulty with these methods is that the recorded information that indicates the location of information on the tape may be easily erased in the event that the tape is re-recorded. Moreover, a typical video cassette tape that is prerecorded is write-protected which would prevent any manufacturer other than the one recording the information on the tape from placing the position-indicating codes on the tape. A particular drawback of magnetic recording of codes on the tape is that they can be read only when the tape is in physical contact with the magnetic read head. In the typical video cassette tape, when in fast forward or rewind modes, the tape is not in contact with the read head. Even if the cassette and playback machines in current use were to be abandoned, so that the read head was in contact with the tape during rewinding or fast forward, it would cause excessive wear on the tape and head during search operations. Moreover, even if the read head was in contact with the tape, the speed of the tape during fast forward and rewind would make accurate location reading difficult or unreliable using the electronic technique in use in most VCR's today.

There are also instances in the prior art, particularly with respect to microfilm and photographic film reading devices, where bar codes are placed on strips of film, permitting a machine-specific optical read-out that relates location indicia with specific optical information on the strip, e.g. a frame on a microfilm tape. This allows a mechanism to retrieve a specific frame on a strip by identifying its associated bar code rather than to locate a specific position on the strip itself. Furthermore, these optically-read bar codes on the film are applied simultaneously with the imprinting of the optical information on the film since it is necessary that the recording mechanism be able to record not only the desire information but the bar code information as well.

Finally, as a result of the popularity of video cassette recording, there are now millions if not billions of cassettes with prerecorded information that are in widespread use. Any mechanism or method for determining the position of information on the tape must be compatible with existing video cassette mechanical structure. Ideally, the method and apparatus for reading the location of information on the tape is also desirably retrofitted to existing VCR equipment.

SUMMARY OF THE INVENTION

The present invention is directed to an improvement in a video cassette recorder which overcomes the problems set forth above through the provision of optically readable indicia on the magnetic tape and optical reading means. A video cassette recorder for playing a video cassette (which contains a magnetic tape having visual images magnetically recorded thereon) has a standard configuration so that there is universality in the cassettes and the recorders. A video cassette includes two spools around which the tape is wound and the bottom wall of the cassette has a pair of openings located between the spools. When the cassette is inserted into the apparatus, the cassette moves into the apparatus in a horizontal position and is then lowered such that the openings fit over tape positioners that are moveably mounted on the frame of the recorder below the cassette. In operation, when the tape is in the rewind or fast forward modes of operation, the positioners are inactive and the tape is wound from one spool to another at a high rate of speed. When in the play mode, the positioners contact the tape and push the tape out of the cassette and toward the read head which is in the same horizontal plane as the video cassette but is horizontally spaced away from the cassette. The tape is then slowly unwound from one spool, passes around the positioners and the read head, and is wound on the other spool.

The improvement is adapted for retrofit installation in existing video recorders but would also be useful in a new recorder configuration. The improvement includes imprinting an optically readable indicia on the magnetic tape surface which is in contact with the tape positioner previous to any magnetic recording on the tape. Optical reading means is, at least partially, movably mounted, for example on at least one of the tape positioners adjacent to the magnetic tape surface, so that as the tape passes from one spool to another whether in rewind, fast forward or play modes, the optically readable indicia may be read and through a suitable visual or audio output indicate the location of magnetically recorded information on the tape adjacent the optical reading means.

BRIEF DESCRIPTION OF THE DRAWINGS

The invention will be described with reference to the accompanying drawings, wherein:

FIG. 8 is a top view showing the details of a second embodiment of the optical reading means;

FIG. 9 is a side view of the embodiment shown in FIG. 8;

FIG. 10 is a top view showing another embodiment of the optical reading means;

FIGS. 11A and 11B show the embodiment of FIG. 10 in detail.

DESCRIPTION OF THE PREFERRED EMBODIMENTS

The following describes the best presently contemplated modes of carrying out the invention. This description is made for the purpose of illustrating the general principle of the invention and is not to be taken in a limiting sense. The scope of the invention is best determined by reference to the appended claims.

Figure 1:
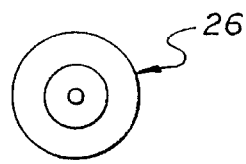
FIG. 1 is an illustration of a standard video cassette mounted in a video cassette recorder (VCR) with the magnetic tape shown in the fast forward or rewind modes of operation.

Referring to FIG. 1, there is shown a video cassette 10 having two spools 11 and 12 around which is wound a magnetic tape 13. The bottom wall of the cassette has two openings 14 and 15 and stationary tape guides 16 and 17. When the cassette 10 is horizontally inserted through a door in the front wall of a video recorder, the cassette moves forward into the recorder and is then dropped or moved downward through suitable guides and mechanism.

Figure 2:
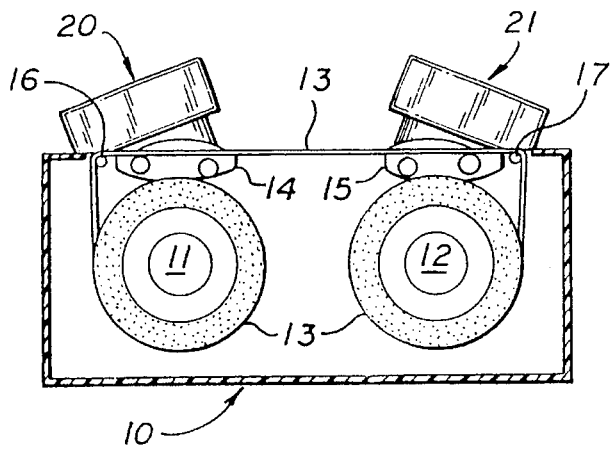
FIG. 2 is a top view of the video cassette recorder with a tape shown in the play mode.

Moveably mounted to the video recorder chassis are a pair of tape positioning means 20 and 21 which, as the cassette is moved down, will project upward into the openings 14 and 15 and are thereby positioned between the tape spools 11 and 12 and the tape 13 and also between the stationary guides 16 and 17 of the cassette 10. As seen in FIG. 2, the positioning means include capstans 22 and 23 as well as guidepins 24 and 25.

FIG. 1 shows the position of the tape positioning means relative to the tape and the cassette spools when the recorder is in the non-operational mode and also when the recorder is in either the fast forward or rewind modes of operation. In FIG. 2 there is shown the cassette and in addition the magnetic read head 26 which is laterally spaced apart from the cassette. When in the play mode, the tape positioners 20 and 21 move horizontally away from the cassette and push the tape out of and away from the cassette and in contact with the read head 26. The tape 13 passes around the capstans 22 and 23 and the positioning pins 24 and 25.

Figure 3:
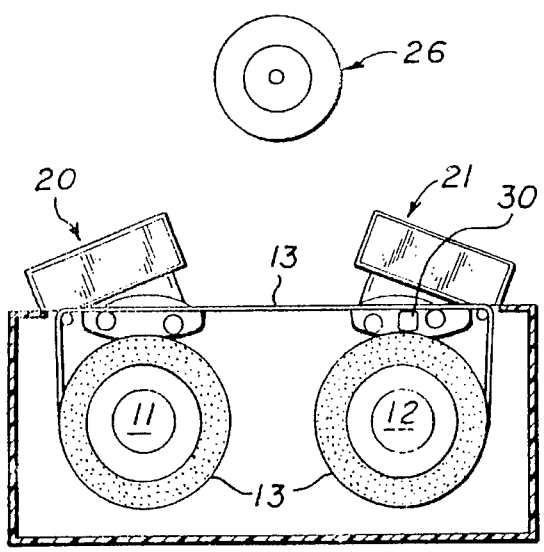
FIG. 3 is a top view of the view cassette recorder with the optical reading means mounted on the tape positioner and the tape shown in the the fast forward or rewind modes of operation.
Figure 4:
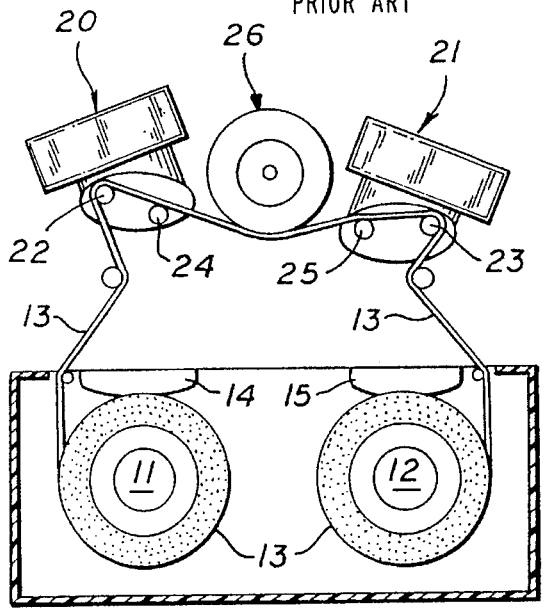
FIG. 4 shows the position of the tape positioner and optical reading means relative to the tape in its play mode of operation.
Figure 4:
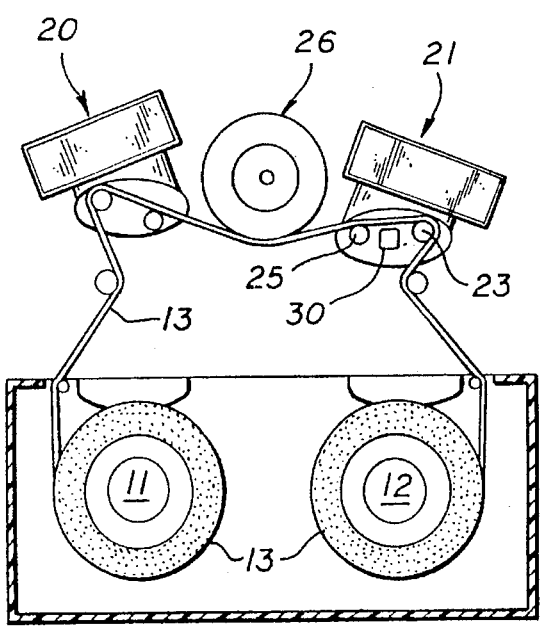
Figure 6:
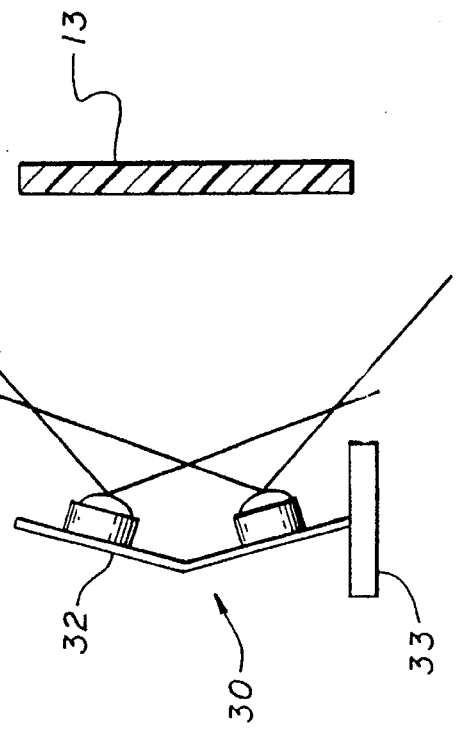
FIG. 6 shows the detail of the optical reading means of FIG. 5 with the tape in the fast forward or rewind mode of operation.

In this embodiment, as shown in FIG. 3, optical reading means 30 is mounted on tape positioning means 21 between the capstan 23 and guide pin 25. As seen in greater detail in FIGS. 5 and 6, the optical reading means 30 comprises a plate 32 supported on a platform 33 of the tape positioning means 21. The optical reading means 30 comprises a light emitting diode 40 and a phototransistor detector 41 which are mounted so that the light from the diode is reflected from the magnetic tape 13 and is received by the detector 41. The optical reading means 30 is well known in the art and various types of visible or infrared light emitters may be used and various types of light detectors are available. As seen in FIG. 6, as contrasted with FIG. 5, the tape 13 when in the fast forward or reverse modes of operation may be laterally spaced a greater distance from the optical reading means 30 than in the play mode of operation. It is therefore important that the light emitter and detector be chosen such that the angle of emission and detection will overlap regardless of the tape position relative to the optical reading means.

Optically Readable Indicia

The location of recorded information on the magnetic tape is obtained by the user from a number appearing on an optical or mechanical read-out or display. The decimal number is obtained from optically readable indicia on the magnetic tape incorporating a simple binary encoding scheme in which "ones" and "zeros" are used in combination to represent the decimal number. Each one and zero is determined from the optically readable indicia imprinted on the magnetic tape surface in contact with the tape positioner. In order to provide a very inexpensive and yet highly robust binary code, a simple encoding scheme, unlike the common Universal Bar Code, is used in the invention. As seen in FIG. 8, the indicia comprises a combination of stripes that alternate with blanks or non-printed area of the tape. The stripe may be optically reflecting if the tape is non-reflective or vice-versa. The indicia is designed so that an information unit comprises an area in which two thirds of the area is either a stripe or a blank. An example is shown in the drawing in which a zero comprises an area which is two thirds blank and one third stripe. A one comprises an area that is two thirds stripe and one third blank. Thus, the ratio of stripe to blank for the two types of information units—a zero and a one—differs from the ratio of blank to stripe by a factor of four, i.e. a zero has a ratio of dark (blank) area to light (stripe) area of two to one and a one has a ratio of light (stripe) area to dark (blank) area of two to one.

To make the indicia easy to print, the coding scheme only requires that the printing mechanism print a stripe width equal to "A". To obtain a double stripe the printer prints twice to obtain a stripe equal to "2A". In this manner the printing mechanism can be extremely simple and operate at high speed so as to permit inexpensive encoding.

The method for determining whether an information unit that is optically read is a stripe or a blank is extremely simple and reliable since if the stripe is wider than the blank the area is decoded as a one whereas if the blank is wider than the stripe, the area is decoded as a zero. Since the stripe width could vary by up to 50% and still be correctly decoded as a one or zero, the printing width tolerance is extremely loose also contributing to the inexpensiveness of the optically readable indicia.

The binary code is used to provide a decimal number by grouping information units on a portion of the tape into a frame, each frame comprising multiple information units that in the aggregate define a decimal number. A frame is delimited by leading and trailing edge information units that are unique with respect to all other information units. This uniqueness derives from the fact that the tape area immediately preceding the leading information units is blank and the tape area immediately following the last information unit of the frame is followed by a stripe and then blank area. This blank area must be at least equal to the width of one information unit so that the optical reading means will recognize a "non-information unit". Preferably, the blank areas preceding and following the leading and trailing information units, respectively, have widths equal to several information units.

Figure 7:
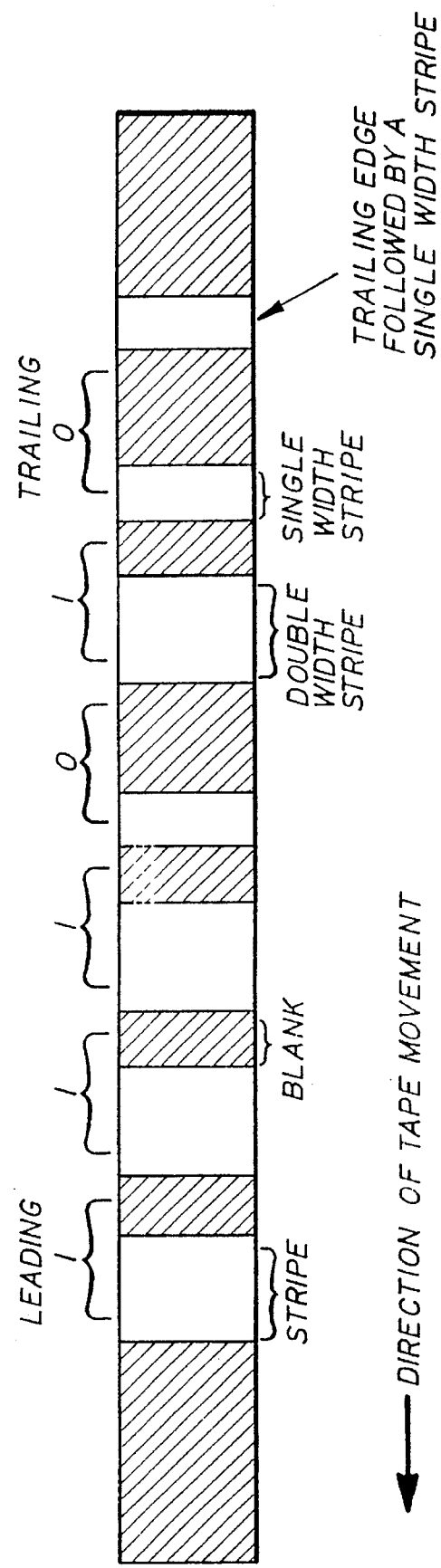
FIG. 7 is one embodiment of optically readable indicia on the magnetic tape.

The tape may move relative to the optical reading means in either direction—moving in one direction in the play or fast forward mode and in the opposite direction in the rewind mode. In order to properly read the optically encoded number on the tape, it is therefore necessary for the optical reading means to be able to identify the leading and trailing edges of the frame on the tape that defines a number. As seen in FIG. 7, this direction sensitivity is provided through the same coding scheme as that which defines the number— using the information unit one to identify the leading edge and the information unit zero followed by one stripe to identify the trailing edge. Thus if the optical reading means identifies the first information unit of a frame as a one, it will then decode the subsequent stripes and blanks into a series of ones and zeros that are read in the order of appearance. Conversely, if the first information unit is a zero, the subsequent ones and zeros are decoded in reverse order so as to determine the correct number in the frame.

It should be noted that it is not necessary to print the optically read indicia at the same time as the magnetic information is recorded. The magnetic tape may be preprinted with the optically read indicia, or may be applied after the magnetic information is recorded.

Digital Filter

The digital filter means provides a solution for inaccuracies in the tape and optically readable indicia due to manufacturing tolerances and the effects of age deterioration and wear and tear while maintaining low cost. The problem is aggravated by the widely divergent speeds at which the recorder operates in play mode and rewind mode. In the play mode, noise due to the tape inaccuracies, has a duration and shape that is highly similar to the "one" signal in the rewind mode. If the duration and shape of noise and valid signals are constant, an analog filter may be used to recover the valid signal. But because the "one" at one speed is equal to noise at another speed, the filter must respond to change in speed.

The digital filter solves the problem by sampling the signal at a high rate of speed relative to the duration of the signal; for example, the sampling rate may be 1000 times for the typical signal duration. The filter may increment a counter each time a noise signal value is received. If the running sum of the samples is above some established threshold, for example 70% of the maximum value, the accumulated values are determined to be a valid signal; if less than 30%, a noise signal. In between these values, the signal is determined to be the same as the prior signal, i.e. valid or noise. By adjusting the threshold for speed, the tape speed variable can be eliminated.

Since the numbers encoded on the tape will have a predictable sequence, other more "intelligent" means of error elimination can alternatively be used.

Alternative Optical Reading Means

In FIGS. 8 and 9 there is shown alternative optical reading means. FIG. 8 shows optical reading means 50 in which an LED and detector 51 are fixedly mounted on the recorder chassis 14 beneath the openings 15 in the cassette 10. To complete the optical reading means 50, a mirror 52 is mounted on the chassis 14. The fixed position of the mirror is such that when the cassette drops into place upon insertion, the mirror projects into the cassette immediately adjacent the tape when in the rest, fast forward or rewind positions. When the tape positioning means 22 moves away from the mirror 52 as in the play mode of operation, the light emitted and detected by the optical means 51 will be diffused. Some means of augmenting the focus of the light from the emitter and the collecting of light by the detector must be provided such as a collimating lens 54.

In FIGS. 10 and 11A and 11B there is shown other optical reading means comprising two independent reading devices 61 and 62. Each device comprises an LED and detector as in the optical reading means 30. The optical reading means 61 is fixed to the VCR chassis and is positioned to project into a cassette 10 opening so as to be immediately adjacent the tape 13 when in the rest, fast forward or rewind modes of operation. Device 62 is fixedly positioned but is vertically movable from a position in which the upper end of the device is below the surface of the VCR chassis when the tape is in the rest, fast forward or rewind modes of operation and is mechanically lifted or raised after the tape positioning means 20 and 21 have moved the tape 13 into contact with magnetic read head 26. As seen in FIGS. 11A and 11B, the devices 61 and 62 are in close proximity to the tape in the various operating modes so that the optical LED and detector devices need not be so precise.

Figure 5:
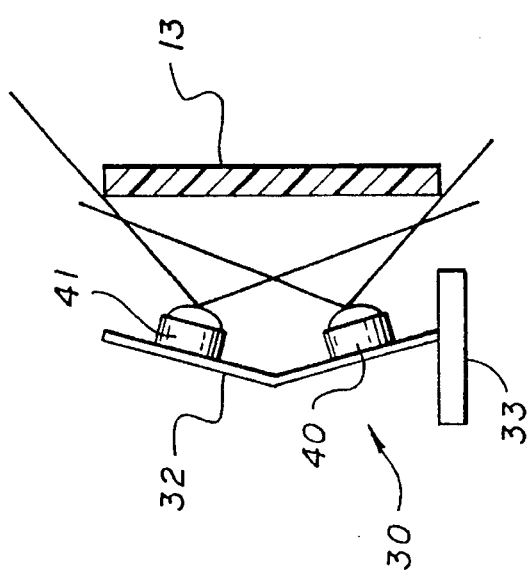
FIG. 5 shows the detail of one embodiment of the optical reading means.

Other optical reading means may substitute optical fibers, individually or in an array for the the electrical wires that connect the LED and detector 40 and 41 shown in FIG. 5 to amplifying, filtering and decoding circuitry. This may make the optical reading means more reliable by eliminating the wires connected to the LED and detector which are movable as the tape positioning means 21 is relocated between the fast forward and the rewind and play modes. A suitable optical emitter and detector may be stationarily-mounted at the fixed end of the optical fibers simplifying the design and construction of the optical reading means.

We claim:

1. In a video tape recorder in which a video cassette, containing a magnetic tape having visual images and audio information recorded thereon, is mounted on two spools and provided with a pair of openings in the cassette lower wall when inserted in the video recorder ready for play, the recorder includes a magnetic tape read head spaced apart from the front wall of the cassette when inserted in the recorder ready for play and moveable tape positioners including guide pins and rollers mounted on a movable support protruding into the pair of openings as the cassette is inserted into the recorder ready for play, the tape positioners remaining immediately adjacent the tape surface when the recorder is in rewind or fast forward modes of operation and moving the tape by contacting and pushing the tape out of the cassette and into contact with the magnetic read head when the recorder is in the play mode of operation, the improvement comprising:

(a) optically readable indicia printed along the entire length of the tape on the surface of the tape in contact with the tape positioner; and (b) means for optically reading a location on the tape that is adjacent the optical reading means, relative to the beginning of the tape, mounted on at least one of the tape positioners so as to be adjacent the tape when the video tape recorder is in the fast forward, rewind or play modes of operation.

2. The improvement of claim 1 wherein the optically readable indicia comprises information units, each unit comprising at least one ink stripe printed on the tape and at least one blank space.

3. The improvement of claim 1 wherein the optically readable indicia comprises an encoded pattern of reflecting and non-reflecting areas on the tape.

4. The improvement of claim 2 wherein the information unit comprises ink stripes and blank spaces of equal width printed in a pattern of two stripes with one blank space or one stripe with two blank spaces, two stripes and one blank space representing a binary one and one stripe and two blank spaces representing a binary zero.

5. The improvement of claim 2 wherein a frame comprises multiple information units including a leading information unit preceded by at least one blank information unit and a trailing unit followed by a single width stripe and at least one blank information unit and each frame defines a decimal number through a binary code.

6. The improvement of claim 5 wherein each frame is provided with an information unit that indicates the direction of the tape relative to the optical reading means.

7. The improvement of claim 6 wherein the direction information units comprises a leading edge unit of two stripes and one blank space and trailing edge unit comprises a single stripe and two blank spaces followed by one single strip.

8. In a video tape recorder that includes a chassis with an opening for receiving a standard VHS video cassette, the cassette containing magnetic tape having recorded information that the operator desires to locate so that such information location may be subsequently re-accessed, the magnetic tape being mounted on two spools within the cassette and the cassette having a pair of openings in the lower wall, the recorder including a magnetic read head within the chassis further, including tape positioners each mounted on a movable support on the chassis, and mechanism for positioning the cassette within the chassis away from the read head and over the tape positioners which then protrude into the pair of openings in the cassette lower wall when the cassette is in the recorder ready for play, the tape positioners remain within the cassette immediately adjacent the tape surface when the recorder is in rewind or fast forward modes of operation and move the tape by contacting and pushing the tape out of the cassette and into contact with the magnetic read head while remaining immediately adjacent the tape surface when the recorder is in the play mode of operation, the improvement comprising:

(a) optically readable indicia printed along the entire length of the tape on the surface of the tape in contact with the tape positioners, such indicia comprising information units, each unit comprising at least one ink stripe printed on the tape and at least one blank space, a plurality of the information units comprising a frame, one of the information units in each frame comprising a leading information unit indicator and a second information unit comprising a trailing information unit indicator, the frame defining a decimal number through a binary code; and (b) means for optically reading the information units and frames on the tape is mounted on at least one of the tape position so as to determine the location of information anywhere along the length of the tape relative to the end of the tape when the apparatus is in the fast forward, rewind, or play modes of operation.

\* \* \* \* \*